US011106436B2

(12) United States Patent
Van Den Hende et al.

(10) Patent No.: US 11,106,436 B2
(45) Date of Patent: Aug. 31, 2021

(54) DEVELOPMENT SYSTEM FOR DEVELOPING A RAILWAY SIGNALIZATION PROGRAM AND ASSOCIATED DEVELOPMENT METHOD

(71) Applicant: ALSTOM Transport Technologies, Saint-Ouen (FR)

(72) Inventors: Jean-Christophe Van Den Hende, Puteaux (FR); Olivier Rolland, Millery (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 0 days.

(21) Appl. No.: 16/265,329

(22) Filed: Feb. 1, 2019

(65) Prior Publication Data

US 2019/0243614 A1    Aug. 8, 2019

(30) Foreign Application Priority Data

Feb. 2, 2018    (FR) ..................... 18 50893

(51) Int. Cl.
G06F 8/34    (2018.01)
G06F 8/38    (2018.01)
G06F 8/33    (2018.01)

(52) U.S. Cl.
CPC ............... *G06F 8/34* (2013.01); *G06F 8/33* (2013.01); *G06F 8/38* (2013.01)

(58) Field of Classification Search
CPC ..................... G06F 8/33; G06F 8/34
See application file for complete search history.

(56) References Cited

U.S. PATENT DOCUMENTS 10,338,897 B2 *  7/2019  Javadi .................. G06F 8/38
2016/0062747 A1 *  3/2016  Stanfill ............... G06F 9/4494
                                                            717/144

FOREIGN PATENT DOCUMENTS

EP         2085879 A1    8/2009
WO    20000060458 A1   10/2000
WO    20060051355 A1    5/2006

OTHER PUBLICATIONS

Ugur Yildirim et al., Application of Functional Safety on Railways Part II: Software Development, Proceedings of 2011 8th Asian Control Conference (ASCC), retrieved online on Mar. 24, 2020, pp. 1096-1101. Retrieved from Internet: <URL: https://ieeexplore.ieee.org/stamp/stamp.jsp?>. (Year: 2011).*

(Continued)

*Primary Examiner* — Hanh Thi-Minh Bui
(74) *Attorney, Agent, or Firm* — Soquel Group LLC

(57) ABSTRACT

A system for developing a railway signalization program including a programming module in text language for the programming, by at least one user, of at least one computer operator, and a memory for the storage of the or each programmed computer operator using the programming module, the system also including a visual environment for the presentation, in the form of a functional graphic element, of at least one computer operator stored in the memory, the visual environment being suitable for allowing the construction, by at least one user, of a visual representation of the railway signalization program from the or each functional graphic element, the system further including an implementation system able to implement the railway signalization program based on the visual representation.

15 Claims, 3 Drawing Sheets

(56) References Cited

OTHER PUBLICATIONS

Oscar medina Duarte and Reinhard Hametner, Asynchronous Programming with Futures in C on a Safety-Critical Platform in the Railway-Control Domain, IEEE, 2017, retrieved online on Dec. 15, 2020, pp. 1-8. Retrieved from the Internet: <URL: https://ieeexplore.ieee.org/stamp/stamp.jsp?tp=&arnumber=8247589>. (Year: 2017).*

Guo Xie et al., Reliability Methodology and Theory for Development of Novel Railway Signaling Systems, Proceedings of the 33rd Chinese Control Conference, Jul. 1, 2014,pp. 6461-6464. Retrieved from the Internet: <URL: https://ieeexplore.ieee.org/stamp/stamp.jsp?tp=&arnumber=6896055>. (Year: 2014).*

* cited by examiner

DEVELOPMENT SYSTEM FOR DEVELOPING A RAILWAY SIGNALIZATION PROGRAM AND ASSOCIATED DEVELOPMENT METHOD

CROSS-REFERENCE TO RELATED APPLICATIONS

This application claims priority of French Patent Application No. 18 50893, filed on Feb. 2, 2018.

FIELD OF THE INVENTION

The present invention relates to a system for developing a railway signalization program, of the type comprising a programming module in text language for the programming, by at least one user, of at least one computer operator, and a memory for the storage of the or each programmed computer operator using the programming module. The invention also relates to a method for developing a railway signalization program.

BACKGROUND OF THE INVENTION

Railway signalization programs are known. They can be carried out by railway signalization systems such as the system described in WO 2006/051355.

The development of these railway signalization programs is subject to standards CENELEC 50128 and IEC 62279. These standards impose a particular development method for railway signalization programs qualified as critical with the aim of guaranteeing a high level of reliability of these programs.

These standards distinguish between two types of development for the railway signalization programs:
software development, in which the programs are produced by using text languages; and
algorithmic development, in which the programs are produced using visual environment languages such as functional box diagrams, relay-based schematics, or sequential function diagrams.

Standards CENELEC EN 50128 and CEI 62279 thus define, for each of these two types of development, the different steps through which the development of a program must go and the deliverables that must be provided in each step so that the obtained program reaches a predefined security level, the security level being able to go from SILO for the least demanding to SIL4 for the most demanding.

As an example, these standards require, for the software development of a level SIL4 program, that the development of this software go through eight steps during which twenty-four deliverables must be produced. In comparison, they only require four steps and eight deliverables for the algorithmic development of a program. This difference is explained by the fact that algorithmic development uses languages generating fewer errors and demands fewer activities and fewer delivered products.

It is thus much easier and less expensive to produce a railway signalization program using algorithmic development. However, despite these obvious advantages, algorithmic development is much less widely used for railway signalization programs. This is due to the fact that the languages used for algorithmic development are typically those defined by standard CEI 61131-3. Yet these languages are very low-level languages only providing basic operations, such as logic operations, arithmetic operations or temporal functions, only able to act and produce basic types of data, such as Boolean, signed or unsigned integer, real floating, and character chain types. These languages thus do not have the expressiveness that may be found with text languages, such that there is no guarantee that railway signaling programs can be produced by using any one of these languages. Furthermore, even if such development was possible, it would be very complex to do and it would be difficult to test the programs thus obtained.

A visual environment language is also known from WO 00/60458. However, this language does not have sufficient expressiveness to be able to be used easily in the development of railway signalization programs.

Railway signalization programs are therefore typically produced entirely using text languages. Yet such a development method takes considerable time due to the large amount of activity to be performed and deliverables to be produced to see to the reliability and quality of the program. As a result, the errors in the specifications of the program have only arisen quite late and are costly to correct.

SUMMARY OF THE DESCRIPTION

One aim of the invention is thus to reduce costs and accelerate the development of railway signalization programs, while maintaining a high level of security of the programs thus produced.

To that end, the invention relates to a development system of the aforementioned type, wherein the development system also comprises a visual environment for the presentation, in the form of a functional graphic element, of at least one computer operator stored in the memory, the visual environment being suitable for allowing the construction, by at least one user, of a visual representation of the railway signalization program from the or each functional graphic element, the production system further comprising an implementation module able to implement the railway signalization program based on the visual representation.

According to specific embodiments of the invention, the development system also includes one or more of the following features, considered alone or according to any technically possible combination(s):
the visual environment makes it possible to duplicate the or each functional graphic element, so as to form a duplicated graphic element;
the or each computer operator is configured to process at least one predefined type of incoming data and to produce at least one predetermined type of outgoing data, the or each functional graphic element having, for the or each predefined type, a respective input for supplying the computer operator with at least one incoming datum of said predefined type, and, for the or each predetermined type, a respective output for the provision, by the computer operator, of at least one outgoing datum of said predetermined type, and the visual environment comprises at least one graphic stream element for connecting the inputs and the outputs of the or each functional graphic element so as to build the visual representation;
the visual environment is suitable for preventing the connection of inputs corresponding to a predefined type to outputs corresponding to a predetermined type different from said predefined type and which does not encompass or constitute a subtype of said predefined type;
each operator has, for each type of incoming and outgoing data that it is configured to process, respectively to produce, a cardinality of said data type defining the number of data of said type that the operator is suitable for processing, respectively for producing, upon each instance of said operator;

at least one operator has a fixed cardinality for at least one type of incoming or outgoing data that it is configured to process, respectively to produce, and the visual environment is suitable for preventing the connection, to the or each input and/or to the or each output with which a fixed cardinality is associated, of a number of graphic stream elements different from said cardinality;

at least one operator has a variable cardinality for at least one type of incoming or outgoing data that it is configured to process, respectively to produce;

the visual environment comprises at least one aggregator graphic element for aggregating several data of basic types into at least one complex-type datum, the visual environment also comprising at least one graphic stream element for connecting at least one input and/or one output of the aggregator graphic element to the at least one output, respectively to at least one input of a functional graphic element;

the aggregator graphic element has, for each basic type, a cardinality of said basic type defining the number of data of said basic type that the aggregator graphic element is suitable for aggregating within the complex-type datum, the cardinality associated with at least one of said basic types being variable; and the visual environment comprises at least one decomposer graphic element for the decomposition of at least one complex-type datum into at several basic-type data, the visual environment also comprising at least one graphic stream element for connecting an input and/or at least one output of the decomposer graphic element to at least one output, respectively to at least one input, of a functional graphic element.

The invention also relates to a method for developing a railway signalization program using a development system as defined above, comprising the following steps:

programming, by a first user, using the programming module, of a plurality of computer operators;

storing each produced computer operator in the memory;

presenting each stored computer operator in the visual environment, in the form of a functional graphic element;

building a visual representation of the railway signalization program, by a second user, in the visual environment, from functional graphic elements; and implementing the railway signalization program from the visual representation, via the implementation module.

According to specific embodiments of the invention, the development method also includes one or more of the following features, considered alone or according to any technically possible combination(s):

the or each computer operator is configured to process at least one predefined type of incoming data and to produce at least one predetermined type of outgoing data, and the or each functional graphic element has, for the or each predefined type, a respective input for supplying the computer operator with at least one incoming datum of said type, and, for the or each predetermined type, a respective output for the provision, by the computer operator, of at least one outgoing datum of said predefined type;

the step for building the visual representation comprises a sub-step for connecting, by the second user, in the visual environment, outputs of several low-level functional graphic elements to the inputs of an aggregator graphic element, and the presentation, by the visual environment, of a representation of a complex-type data stream representing a complex-type data stream resulting from the aggregation of output data produced by the computer operator(s) represented by said low-level functional graphic elements;

the step for building the visual representation comprises a sub-step for connecting, by the second user, in the visual environment, an output of a high-level functional graphic element to an input of a decomposer graphic element, and the presentation, by the visual environment, of representations of basic-type data streams representing basic-type data streams resulting from the decomposition of an outgoing datum produced by the computer operator represented by the high-level functional graphic element;

the programming step is carried out pursuant to standards CENELEC EN 50128 and CEI 62279; and the step for building the visual representation comprises a sub-step for duplicating a functional graphic element, so as to form a duplicated graphic element, followed by a sub-step for connecting at least one input or at least one output of said duplicated graphic element to an output, respectively an input, of another functional graphic element.

BRIEF DESCRIPTION OF THE DRAWINGS

Other features and advantages of the invention will appear upon reading the following description, provided solely as an example and done in reference to the appended drawings, in which.

DETAILED DESCRIPTION

Figure 1:
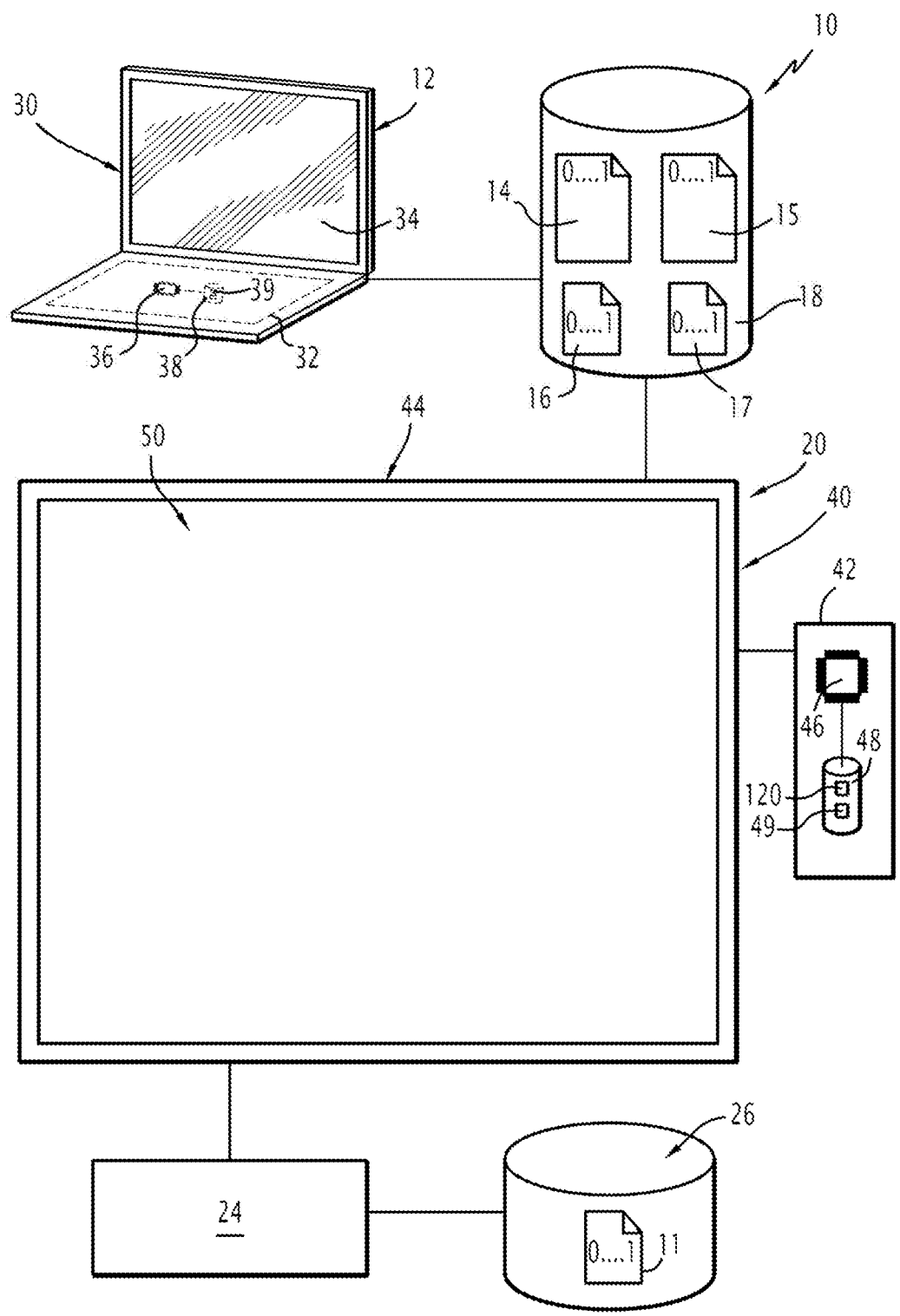
FIG. 1 is a schematic illustration of a development system according to the invention.

The development system 10 shown in FIG. 1 is intended to develop a railway signalization program 11. To that end, the system 10 comprises a first programming module 12 in text language for programming, by at least one user, of at least one computer operator 14, 15, 16, 17, a memory 18 for storing the or each computer operator 14, 15, 16, 17 programmed using the programming module 12, a second module 20 for programming in graphic language for building, by a user, a visual representation 22 (FIG. 2) of the railway signalization program 11, an implementation module 24, able to implement the railway signalization program 11 as a function of the visual representation 22, and a storage medium 26 for storing the completed railway signalization program 11.

The first programming module 12 is intended for the programming, in text language, of computer operators configured to process at least one incoming datum and produce at least one outgoing datum. To that end, the programming module 12 comprises, in a known manner, equipment 30 including an information processing unit 32 and a man-machine interface 34, the information processing unit 32 comprising a processor 36 and a memory 38 associated with the processor 36, the memory 38 storing programming software in text language 39 able to be executed by the processor 36 so as to present the user, via the man-machine interface 34, with a programming interface in text language. The programming software 39 typically comprises programming software in C, C++, C#, Ada or another language. It is advantageously coupled with project management software for software development (not shown) suitable for requiring users of the first programming module 12 to adopt the phases and deliverables defined by standards CENELEC EN 50128: 2011 and CEI 62279:2015 in case of software development.

The memory 18 stores a plurality of operators 14, 15, 16, 17 programmed using the programming module 12 so as not to be context-sensitive.

Each of these operators 14, 15, 16, 17 is configured to process at least one predefined type of incoming data and to produce at least one predetermined type of outgoing data. In other words, each operator 14, 15, 16, 17 is configured to process at least one incoming datum of at least one predefined type, and to produce at least one outgoing datum of at least one predetermined type. In particular, each of the operators 14, 15, 16, 17 is configured only to process incoming data of the or each predefined type and only to produce outgoing data of the or each predetermined type.

Each operator 14, 15, 16, 17 has, for each type of incoming and outgoing data that it is configured to process, respectively to produce, a cardinality of said data type. This cardinality defines the number of data of said type that the operator 14, 15, 16, 17 is suitable for processing, respectively for producing, upon each instance of said operator 14, 15, 16, 17.

These operators 14, 15, 16, 17 here comprises a first operator 14 configured to process four predefined types of incoming data and to produce a single predetermined type of outgoing data. The first operator 14 is for example a linear acceleration calculation operator, the predefined incoming data types of which are made up of:
 a current linear speed type;
 a previous linear speed type;
 a speed production date type; and
 a calculation period type,
and the outgoing datum of which is made up of:
 a linear acceleration type.

The operator 14 in particular has a fixed cardinality for each of these types, i.e., the operator 14 is configured only to process or produce a predefined number of data for each of these types at each of its instances. This cardinality is typically [1, 1], i.e., the operator 14 is configured only to process or produce a single datum of each of these types at each of its instances.

In the illustrated example, the operators 14, 15, 16, 17 also comprise a second and third operator 15, 16 each configured to process a single predefined type of incoming data and to produce a single predetermined type of outgoing data.

Each of the second and third operators 15 and 16 in particular has a fixed cardinality for its predefined type of incoming data, and a variable cardinality for its predetermined type of outgoing data, i.e., each of the second and third operators 15, 16 is configured only to process, at each of its instances, a predefined number of data of the predefined type, but is suitable for producing a variable number of data of the predetermined type.

The operator 15 is for example a speed duplication operator, the predefined type of incoming data of which is made up of a speed type, the associated cardinality of which is [1, 1], i.e., the operator 15 is configured only to process a single datum of this type at each of its instances, and the predetermined outgoing data type of which is made up of a speed type, the associated cardinality of which is [1, +∞[, i.e., the operator 15 is configured to produce from one to a multitude of data of this type at each of its instances.

The speed type is a type encompassing the current linear speed and previous linear speed types. In other words, the current linear speed and previous linear speed types are speed type sub-types, i.e., any datum of the current linear speed and previous linear speed type also constitutes a speed-type datum.

The operator 16 is for example a date duplication operator, the predefined type of incoming data of which is made up of a date type, the associated cardinality of which is [1, 1], i.e., the operator 16 is configured only to process a single datum of this type at each of its instances, and the predetermined outgoing data type of which is made up of a date type, the cardinality of which is [1, +∞[, i.e., the operator 16 is configured to produce from one to a multitude of data of this type at each of its instances.

The date type is a type encompassing the production date type of the speed. In other words, the production date type of the speed is a sub-type of the date type, i.e., any production date-type datum of the speed also constitutes a date-type datum.

In the illustrated example, the operators 14, 15, 16, 17 also comprise a fourth operator 17 configured to process to predefined types of incoming data and produce two predetermined types of outgoing data.

The fourth operator 17 in particular has a fixed cardinality for each of these types, i.e., the operator 17 is configured only to process or produce a predefined number of data for each of these types at each of its instances.

The operator 17 is for example a linear speed calculation operator, the predefined incoming data types of which are made up of:
 an odometer configuration type, the associated cardinality of which is [1, 1], i.e., the operator 17 is configured only to process a single datum of this type at each of its instances; and
 an odometer movement type, the associated cardinality of which is [5, 5], i.e., the operator 17 is configured necessarily to process five data of this type at each of its instances,
and the predetermined outgoing data types are made up of:
 a linear speed type, the associated cardinality of which is [1, 1], i.e., the operator 17 is configured only to process a single datum of this type at each of its instances; and
 a production date type, the associated cardinality of which is [1, 1], i.e., the operator 17 is configured only to process a single datum of this type at each of its instances.

The linear speed type is a type encompassing the current linear speed and previous linear speed types. Furthermore, the linear speed type is a sub-type of the speed type.

The production date type is in turn a sub-type of the date type.

The second programming module 20 comprises equipment 40 including an information processing unit 42 and a man-machine interface 44, the information processing unit 42 comprising a processor 46 and a memory 48 associated with the processor 46, the memory 48 storing programming software in graphic language 49 able to be executed by the processor 46 so as to present the user, via the man-machine interface 44, with a visual environment 50 for the presentation, in functional graphic element form 52, 53, 54, 55, 56, 57 (FIG. 2) for example made up of blocks, with computer operators 14, 15, 16, 17 stored in the memory 18.

In the illustrated example, the equipment 40 is different from the equipment 30 of the first programming module.

Alternatively (not shown), the equipment 30 and 40 is combined, like the information processing units 32 and 42 and the man-machine interfaces 34, 44. Also alternatively, only the information processing units 32 and 42 are combined, said information processing units 32 and 42 being made up of an information processing unit shared between the first and second programming modules 12, 20.

Figure 2:
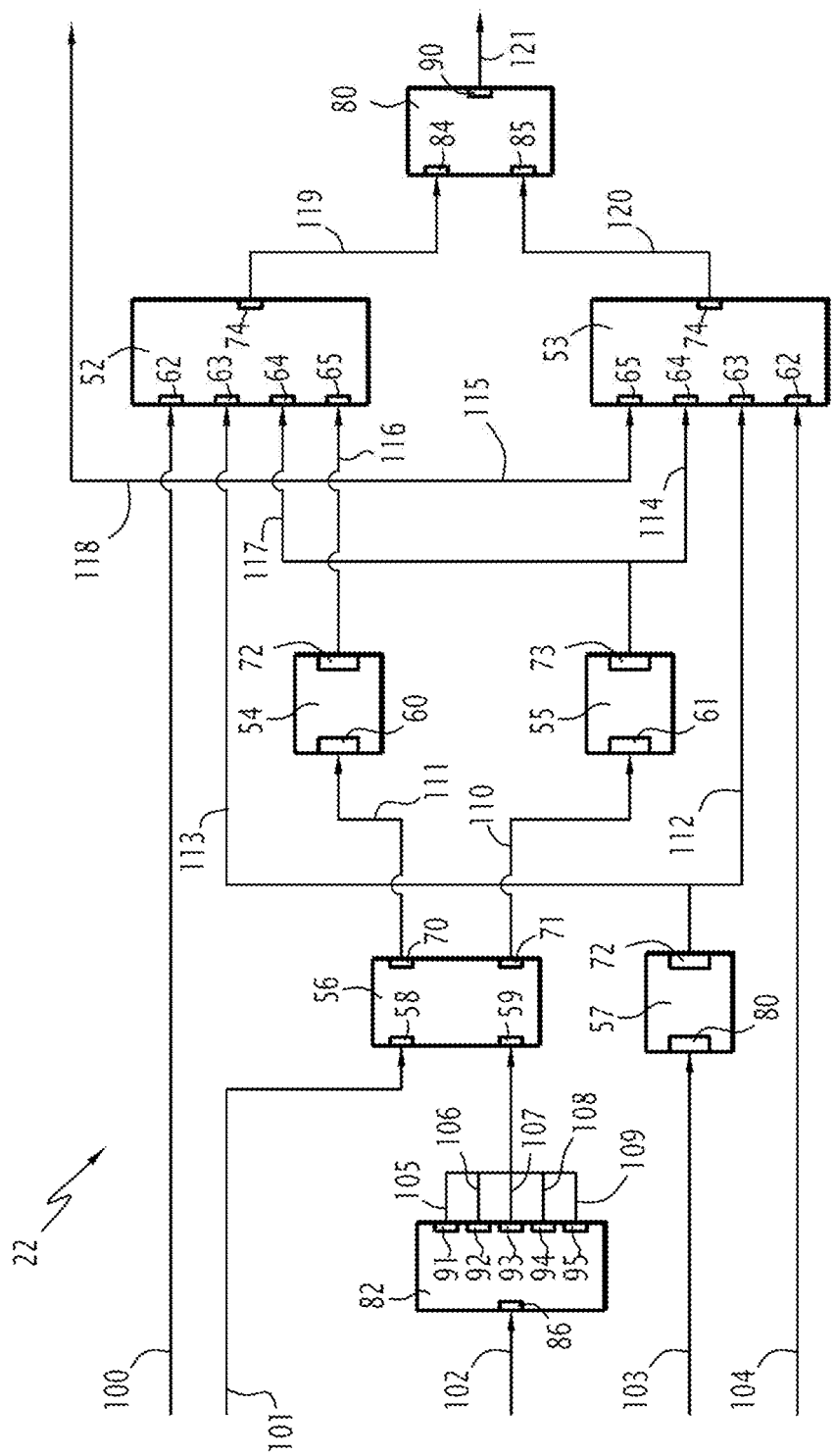
FIG. 2 is an example graphic representation of a railway signalization program developed using the development system of FIG. 1.

In reference to FIG. 2, there are six graphic elements 52, 53, 54, 55, 56, 57, including a first functional graphic element 52 having a first instance of the first operator 14, a second functional graphic element 53 having a second instance of the first operator 14, a third functional graphic element 54 having a first instance of the second operator 15, a fourth functional graphic element 55 having an instance of the third operator 16, a fifth functional graphic element 56 having an instance of the fourth operator 17, and a sixth functional graphic element 57 having a second instance of the second operator 15.

Each functional graphic element 52, 53, 54, 55, 56, 57 has, for the or each predefined incoming data type that the corresponding computer operator 14, 15, 16, 17 is configured to process, a respective input 58, 59, 60, 61, 62, 63, 64, 65, for supplying said corresponding computer operator 14, 15, 16, 17 with at least one incoming datum of said predefined type. Each functional graphic element 52, 53, 54, 55, 56, 57 also has, for the or each predetermined outgoing data type that the corresponding computer operator 14, 15, 16, 17 is configured to produce, a respective output 70, 71, 72, 73, 74, for the supply, by said corresponding computer operator 14, 15, 16, 17, of at least one outgoing datum of said predetermined type.

Thus, the first operator 14 being configured to process incoming data of four predefined types and to produce outgoing data of a single predetermined type, the corresponding functional graphic elements 52, 53 each comprise four inputs 62, 63, 64, 65, each corresponding to one of said predefined types, and a single output 74 corresponding to the predetermined type. The input 62 typically corresponds to the calculating period, the input 63 typically corresponds to the previous linear speed type, the input 64 typically corresponds to the speed production date type, and the input 65 typically corresponds to the current linear speed type.

Furthermore, the second and third operators 15, 16 each being configured to process incoming data of a single predefined type and to produce outgoing data of a single predetermined type, the corresponding functional graphic elements 54, 55, 57 each comprise a single input 60, 61 corresponding to said predefined type, and a single output 72, 73 corresponding to said predetermined type. The input 60 and the output 72 of the functional graphic elements 54, 57 typically each correspond to the speed type. The input 61 and the output 73 of the functional graphic element 55 typically each correspond to the date type.

Lastly, the fourth operator 17 being configured to process incoming data of two predefined types and produce outgoing data of two predetermined types, the corresponding functional graphic element 56 comprises two inputs 58, 59, each corresponding to one of said predefined types, and two outputs 70, 71 each corresponding to one of said predetermined types. The input 58 typically corresponds to the odometer configuration type, the input 59 typically corresponds to the odometer movement type, the output 70 typically corresponds to the linear speed type, and the output 71 typically corresponds to the production date type.

The graphic language programming software 49 is also configured to allow the duplication of the functional graphic elements 52, 53, 54, 55, 56, 57, so as to produce duplicated graphic elements such as the graphic element 53, which consists of a duplication of the functional graphic element 52, and the graphic element 57, which consists of a duplication of the functional graphic element 54.

The graphic language programming software 49 is further configured to present, in the visual environment 50, aggregator graphic elements 80 (only one being shown here), typically in block form, each showing the aggregation of several types of basic data into a complex data type, and decomposer graphic elements 82 (only one being shown here), typically in block form, each representing the decomposition of a complex data type into several basic data types. It should be understood that the terms "basic" and "complex" used here are used simply in a relative sense with respect to one another, a data type described as "complex" consisting of the aggregation of several types of data described in comparison to "basic".

Each aggregator graphic element 80 comprises a plurality of inputs 84, 85 for supplying the aggregator 80 with basic-type data to be aggregated, and a single output 90 for supplying at least one complex-type datum resulting from the aggregation of the basic-type data. The aggregator graphic element in particular comprises a respective input 84, 85 for each of said basic types.

Each aggregator graphic element 80 has, for each basic data type, a cardinality of said data type. This cardinality defines the number of data of said basic type that the aggregator graphic element 80 is suitable for aggregating within the complex-type datum. Preferably, for at least one basic data type, the cardinality associated with said type is variable, i.e., the aggregator graphic element 80 is suitable for aggregating, within the complex-type datum, a variable number of data of said basic type.

Each decomposer graphic element 82 comprises a single input 86 for supplying the decomposer 82 with at least one complex-type datum to be decomposed, and a plurality of outputs 105, 106, 107, 108, 109 for supplying basic-type data resulting from the decomposition of the complex-type datum. The decomposer graphic element 82 in particular comprises a respective output 105, 106, 107, 108, 109 for each of said basic types.

Each decomposer graphic element 82 has, for each basic data type, a cardinality of said data type. This cardinality defines the number of data of said basic type that the decomposer graphic element 82 is suitable for producing by desegregating the complex-type datum. Preferably, for at least one basic data type, the cardinality associated with said type is variable, i.e., the decomposer graphic element 82 is suitable for decomposing a complex-type incoming datum into a variable number of data of said basic type.

The graphic programming software 49 is lastly configured so that the visual environment 50 allows the connection, by a user, of the inputs 58, 59, 60, 61, 62, 63, 64, 65, 84, 85, 86 and outputs 70, 71, 72, 73, 74, 90, 105, 106, 107, 108, 109 of the various graphic elements 52, 53, 54, 55, 56, 57, 80, 82 so as to build the visual representation 22 of the railway signalization program 11. To that end, the graphic programming software 49 is configured so that the visual environment 50 allows the manipulation of graphic stream elements 100, . . . , 121, typically in the form of arrows, each representing a data stream of a given type and able to connect the inputs 59, 60, 61, 62, 63, 64, 65, 84, 85, 86 and the outputs 70, 71, 72, 73, 74, 90, 105, 106, 107, 108, 109 of the various graphic elements 52, 53, 54, 55, 56, 57, 80, 82.

The graphic language programming software 49 is in particular configured such that this connection is done so as to respect all of the data types corresponding to said inputs 59, 60, 61, 62, 63, 64, 65, 84, 85, 86 and outputs 70, 71, 72, 73, 74, 90, 105, 106, 107, 108, 109 and to respect the cardinality of each operator 14, 15, 16, 17 for each type. The graphic language programming software 49 is thus configured such that the visual environment 50 prevents the connection of graphic stream elements 100, . . . , 121 representing data streams of data types with inputs 59, 60, 61, 62, 63, 64, 65, 84, 85, 86 or outputs 70, 71, 72, 73, 74, 90, 105, 106, 107, 108, 109 not corresponding to these types, and therefore in particular prevents the connection of inputs 59, 60, 61, 62, 63, 64, 65, 84, 85, 86 corresponding to a predefined type of outputs 70, 71, 72, 73, 74, 90, 105, 106, 107, 108, 109 corresponding to a predetermined type different from said predefined type and that does not encompass or constitute a subtype of said predefined type. The graphic language programming software 49 is also configured such that the visual environment 50 prevents the connection to the inputs 59, 60, 61, 62, 63, 64, 65, 84, 85, 86 and the outputs 70, 71, 72, 73, 74, 90, 105, 106, 107, 108, 109 with which a fixed cardinality is associated of a number of graphic stream elements 100, . . . , 121 different from said cardinality.

Thus, the graphic language programming software 49 is configured not to allow the connection to:
the inputs 65 of the graphic elements 52, 53 except for outputs corresponding to linear speed types, i.e., the outputs 70 and 72 of the graphic elements 56 and 54;
the inputs 64 of the graphic elements 52, 53 except for outputs corresponding to speed date production types, i.e., the outputs 71 and 73 of the graphic elements 56 and 55;
the input 60 of the graphic element 54 except for outputs corresponding to speed types, i.e., the output 70 of the graphic element 56; and
the input 61 of the graphic element 55 except for outputs corresponding to date types, i.e., the output 71 of the graphic element 56.

The graphic language programming software 49 is also configured to allow the connection of only a single graphic stream element 100, . . . , 121 to the inputs 58, 60, 61, 62, 63, 64, 65 and to the outputs 70, 71, 74, to require the connection of five graphic stream elements 100, . . . , 121 to the input 59, and to allow the connection of an unlimited number of graphic stream elements 100, . . . , 121 to the outputs 72, 73.

Returning to FIG. 1, the graphic programming software 49 is preferably, as shown, coupled to project management software for the application development 120, which is also stored in the memory 48 and able to be executed by the processor 46, this software 120 being suitable for imposing the phases and deliverables defined by standards CENELEC EN 50128:2011 and CEI 62279:2015 on users of the second programming module 20 in case of application development.

The implementation module 24 is typically made up of a compiler able to compile the visual representation 22 in a language executable by a processor of a railway signalization system, for example in machine language, so as to obtain the railway signalization program 11. Alternatively (not shown), the implementation module 24 is made up of an interpreter able to execute the railway signalization program 11 directly from the visual representation 22, without conversion of said visual representation 22 into another language.

The implementation module 24 is preferably integrated into the equipment 40 and is typically made in the form of software stored in the memory 48 of the information processing unit 42 and executable by the processor 46.

The storage medium 26 is typically formed by a removable storage medium mounted on the equipment 40, for example a USB key. Alternatively (not shown), the storage medium 26 is made up of a remote memory accessible by the equipment 40 via a computer network. Also alternatively (not shown), the storage medium 26 is made up of an internal memory of the equipment 40.

Figure 3:
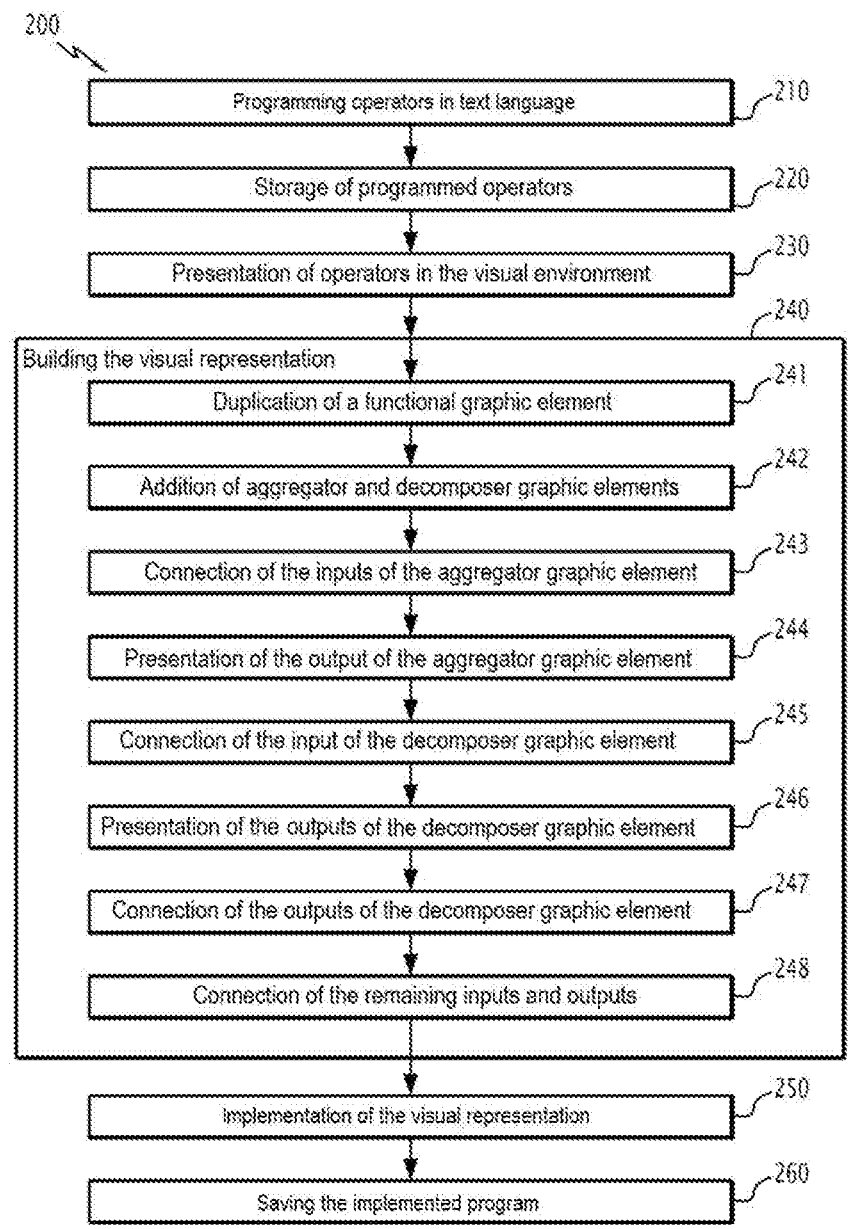
FIG. 3 is a block diagram of a method for developing a railway signalization program carrying out the development system of FIG. 1.

A method 200 for developing a railway signalization program using the development system 10 will now be described, in reference to FIG. 3.

First, during a first programming step 210, a first user, typically a software engineer, uses the programming module 12 to program a plurality of computer operators, including the computer operators 14, 15, 16, 17, each of said computer operators being configured to process at least one incoming datum and to produce at least one outgoing datum.

This programming is done pursuant to standards CENELEC EN 50128 and CEI 62279, i.e., in accordance with the phases and the deliverables defined by these standards for software development.

These computer operations are next stored in the memory 18, during a second storage step 220.

Then, during a third presentation step 230, each computer operator stored in the memory 18 is presented to a second user, typically a system engineer, in the visual environment 50, in the form of a functional graphic element, each functional graphic element having at least one input to supply the corresponding computer operator with at least one incoming datum of a predefined type, and at least one output for the supply, by the corresponding computer operator, at least one outgoing datum of a predetermined type. This step 230 in particular includes the presentation of the operators 14, 15, 16, 17 in the form of functional graphic elements 52, 54, 55, 56.

Next, during a fourth building step 240, the second user builds the visual representation 22 of the railway signalization program by connecting, in the visual environment, inputs and outputs of the functional graphic elements.

First, during a first duplication sub-step 241, the second user duplicates the functional graphic elements 52, 54 in order to respectively form the functional graphic elements 53, 57.

Next, during a second addition sub-step 242, the second user adds the aggregator graphic element 80 and the decomposer graphic element 82.

Then, during a third sub-step 243 for connecting inputs of the aggregator graphic element 80, the second user connects, using graphic stream elements 119, 120, the outputs 74 of the functional graphic elements 52 and 53 to the inputs 84, 85 of the aggregator graphic element 80; the type of outgoing data of the operator 14 is therefore considered, by the aggregator graphic element 80, to be a basic type: the functional graphic elements 52 and 53 then constitute, for this aggregator graphic element 80, low-level functional graphic elements.

The visual environment 50 then has, during a fourth sub-step 244 for presentation of the output 90 of the aggregator graphic element, a representation of a complex-type data stream, here made up of the graphic stream element 121, representing a complex-type data stream resulting from the aggregation of the outgoing data produced by the instances of the computer operator 14. This complex type here consists of a consolidated acceleration type made up of the aggregation of the linear acceleration types produced by the first and second instances of the operator 14.

Then, during a fifth sub-step 245 for connecting the input of the decomposer graphic element, the second user connects a graphic stream element 102 coming from a data source (not shown), for example a sensor, to the input 86 of the decomposer graphic element 82. The outgoing data produced by the data source is therefore considered, by the decomposer graphic element 82, to be a complex datum.

The visual environment 50 then has, during a sixth sub-step 246 for presentation of the outputs of the decomposer graphic element, basic data representations, here made up of the graphic stream elements 105, 106, 107, 108, 109 representing the basic data resulting from the decomposition of the outgoing data produced by the data source. These basic data typically consist of five odometer tooth movements.

The graphic stream elements 105, 106, 107, 108, 109 are then connected to the input 59 of the graphic element 56 during a seventh sub-step 247.

Lastly, during an eighth sub-step 248 for connecting the remaining inputs and outputs, the second user connects the remaining inputs 58, 60, 61, 62, 63, 64, 65 and remaining outputs 70, 71, 72, 73 of the graphic elements 52, 53, 54, 55, 56, 57 using graphic stream elements 100, 101, 103, 110, 111, 112, 113, 114, 115, 116, 118. In particular, in the illustrated example, the second user connects:
- the input 58 of the functional graphic element 56, using the graphic stream element 101, to a data source (not shown), for example a configuration data source;
- the input 60 of the functional graphic element 57, using the graphic stream element 103, to a data source (not shown), for example the output of a functional graphic element (not shown) representing an operator producing linear speed-type data;
- the output 72 of the functional graphic element 57 to the inputs 63 of the functional graphic elements 52, 53 via the graphic stream elements 112, 113;
- the output 70 of the functional graphic element 56 to the input 60 of the functional graphic element 54 using the graphic stream element 111;
- the output 71 of the functional graphic element 56 to the input 61 of the functional graphic element 55 using the graphic stream element 110;
- the input 62 of each of the functional graphic elements 52, 53, respectively using graphic stream elements 100, 104, to a respective data source (not shown), for example a configuration data source;
- the output 72 of the functional graphic element 54 to the input 65 of each of the functional graphic elements 52, 53, respectively using respective graphic stream elements 115, 116, and to a data consumer (not shown), for example a train localization functional operator, using the graphic stream element 118; and
- the output 73 of the functional graphic element 55, using graphic stream elements 114, 117 at the inputs 64 respectively of the functional graphic element 53 and the functional graphic element 52.

Advantageously, this building step 240 is carried out pursuant to standards CENELEC EN 50128 and CEI 62279, i.e., in accordance with the phases and the deliverables defined by these standards for application development.

Lastly, following the building step 240, the second user launches the implementation module 24, said module 24 implementing, during a fifth implementation step 250, the railway signalization program 11 from the visual representation 22.

The railway signalization program 11 is lastly saved on the storage medium 26 during a final saving step 260.

Owing to the invention described above, the costs and development time for railway signalization programs are considerably reduced. Indeed, the development system and method 10, 200 allow easy reuse of the computer operators 14, 15, 16, 17 programmed in text language; it is thus easily possible to reuse portions of code of one railway signalization program to produce another railway signalization program. Furthermore, the development system and method 10, 200 allow the software teams and system teams to work in parallel, which clearly reduces the total development time of the program.

The invention also simplifies the implementation of the railway signalization program 11, and makes it possible to detect and easily resolve errors in the specifications of the program.

Lastly, the invention makes it possible to develop a railway signalization program with a high safety level, since the development is done in accordance with standards CENELEC 50128 and IEC 62279.

The invention claimed is:

1. A development system for developing a railway signalization program pursuant to standards CENELEC EN 50128 and CEI 62279, the railway signalization program being adapted to be carried out by a railway signalization system, the development system comprising:
   a text language programming module for programming, by at least one user, at least one computer operator, each computer operator processing at least one predetermined type of incoming data compatible with the computer operator, and producing at least one predetermined type of outgoing data compatible with the computer operator;
   a memory storing the at least one computer operator that is programmed with said text language programming module;
   a graphic language programming module storing graphic language programming software converting the at least one computer operator stored in said memory in a form of at least one functional graphic element, each functional graphic element having, for each predefined type of incoming data, a respective input for supplying the computer operator with at least one incoming datum of the predetermined type, and, for each predetermined type of outgoing data, a respective output for providing, by the computer operator, at least one outgoing datum of the predetermined type;
   a visual environment for presenting the at least one functional graphic element provided by the graphical language programming module, the visual environment allowing construction, by at least one user, of a visual representation of a railway signalization program from the at least one functional graphic element provided by the graphical language programming module; and
   an implementation module implementing the railway signalization program based on the visual representation, the implementation module comprising a compiler to compile the visual representation in a language executable by the railway signalization system, or an interpreter to execute the railway signalization program directly from the visual representation.

2. The development system according to claim 1, wherein said visual environment makes it possible to duplicate each functional graphic element, so as to form a duplicated graphic element.

3. The development system according to claim 1, wherein said visual environment comprises at least one graphic stream element for connecting the inputs and the outputs of each functional graphic element so as to build the visual representation.

4. The development system according to claim 3, wherein said visual environment is suitable for preventing connection of inputs of a predetermined type of incoming data compatible with a computer operator, to outputs of a type of outgoing data not compatible with the computer operator, and not encompassing or constituting a subtype of the predetermined type of output data compatible with the computer operator, so that when the inputs of each functional graphic element converted from the computer operator are connected to outputs, then inputs of the predetermined type of incoming data compatible with the computer operator are connected to outputs of the predetermined type of outgoing data compatible with the computer operator.

5. The development system according to claim 3, wherein each computer operator produces, for each type of incoming data compatible with the computer operator and for each type of outgoing data compatible with the computer operator that it processes, a cardinality of the data type defining the number of data of the type that the computer operator is suitable for processing and for producing, respectively, upon each instantiation of the computer operator.

6. The development system according to claim 5, wherein at least one computer operator has a fixed cardinality for at least one type of incoming data compatible with the computer operator or one type of outgoing data compatible with the computer operator, and wherein said visual environment is suitable for preventing connection, to each computer operator input and/or to each computer operator output with which a fixed cardinality is associated, of a number of graphic stream elements different from the cardinality.

7. The development system according to claim 5, wherein the at least one computer operator has a variable cardinality for at least one type of incoming data compatible with the at least one computer operator or for at least one type of outgoing data compatible with the at least one computer operator.

8. The development system according to claim 1, wherein said visual environment comprises:
at least one aggregator graphic element for aggregating several basic types of data into a complex-type datum; and
at least one graphic stream element connecting at least one input and/or one output of said aggregator graphic element to at least one output and/or to one input of a functional graphic element, respectively.

9. The development system according to claim 8, wherein said aggregator graphic element has, for each basic type, a cardinality of the basic type defining the number of data of the basic type that said aggregator graphic element is suitable for aggregating within the complex-type datum, the cardinality associated with at least one of the basic types being variable.

10. The development system according to claim 1, wherein said visual environment comprises:
at least one decomposer graphic element decomposing a complex-type datum into several basic types of data; and
at least one graphic stream element connecting an input and/or at least one output of said decomposer graphic element to at least one an output and/or to at least one input, respectively, of a functional graphic element.

11. The development system according to claim 1, wherein the text language programming module comprises a man-machine interface for programming, by the at least one user, the at least one computer operator.

12. A development method for developing a railway signalization program using a development system according to claim 1, the railway signalization program being carried out by a railway signalization system, wherein the development method comprises:
programming, by a first user, using the text language programming module of the development system, of a plurality of computer operators, each computer operator processing at least one predetermined type of incoming data compatible with the computer operator, and producing at least one predetermined type of outgoing data compatible with the computer operator, wherein said programming is carried out pursuant to standards CENELEC EN 50128 and CEI 62279;
storing each programmed computer operator in the memory;
converting each computer operator stored in the memory in a form of a functional graphic element using the graphic language programming module of the development system, each functional graphic element having, for each predefined type of incoming data, a respective input supplying the computer operator with at least one incoming datum of the predetermined type, and, for each predetermined type of outgoing data, a respective output for providing, by the computer operator, at least one outgoing datum of the predetermined type;
presenting each functional graphic element in the visual environment of the development system;
building a visual representation of the railway signalization program, by a second user, in the visual environment of the development system, from the functional graphic elements; and
implementing the railway signalization program from the visual representation, via the implementation module of the development system, wherein the implementation module compiles the railway signalization program in a language executable by the railway signalization system, or executes the railway signalization program directly from the visual representation.

13. The development method according to claim 12, wherein each computer operator is configured to process at least one predetermined type of incoming data, and to produce at least one predetermined type of outgoing data, and the functional graphic element converted from the computer operator has an input for supplying the computer operator with at least one incoming datum of each predetermined type of incoming data, and an output for provision, by the computer operator, of at least one outgoing datum of each predetermined type of outgoing data.

14. The development method according to claim 12, wherein said building a visual representation comprises:
connecting, by the second user, in the visual environment of the development system, outputs of several low-level graphic elements to inputs of an aggregator graphic element; and
presenting, by the visual environment, a representation of a complex-type data stream resulting from aggregation of output data produced by the computer operator(s) represented by the low-level functional graphic elements.

15. The development method according to claim 12, wherein said building the visual representation comprises:

connecting, by the second user in the visual environment, an output of a high-level functional graphic element to an input of a decomposer graphic element; and presenting, by the visual environment, representations of basic type data streams resulting from the decomposition of an outgoing datum produced by the computer operator represented by the high-level functional graphic element.

\* \* \* \* \*